United States Patent [19]

Nery

[11] 3,882,388

[45] May 6, 1975

[54] APPARATUS INCLUDING A PIEZOELECTRIC ELEMENT FOR CHECKING THE OPERATIVENESS OF A VOLTAGE TESTER

[75] Inventor: Maurice Nery, Paris, France

[73] Assignee: IPA Intarnationale Patent - und Lizenz-Anstalt, Vaduz, Liechtenstein

[22] Filed: Feb. 28, 1974

[21] Appl. No.: 447,125

Related U.S. Application Data

[63] Continuation of Ser. No. 260,081, June 6, 1972, abandoned.

[30] Foreign Application Priority Data

June 7, 1971  France .............................. 71.20505

[52] U.S. Cl. ................. 324/133; 324/122; 310/8.7
[51] Int. Cl. ...................... G01r 19/16; G01r 13/36
[58] Field of Search ................... 324/122, 133, 72.5; 310/8.7; 340/251

[56] References Cited
UNITED STATES PATENTS

| | | | |
|---|---|---|---|
| 3,265,969 | 8/1966 | Cato | 324/122 X |
| 3,425,049 | 1/1969 | Robinson | 324/133 X |
| 3,558,903 | 1/1971 | Yamano | 310/8.7 |

Primary Examiner—Gerard R. Strecker
Attorney, Agent, or Firm—Ladas, Parry, Von Gehr, Goldsmith & Deschamps

[57] ABSTRACT

An apparatus for checking a voltage tester as well as a voltage tester equipped with such apparatus. The apparatus for checking an electrical device comprises at least one piezoelectric element connected in series with at least one spark path, and means for exerting a mechanical load upon the piezoelectric element.

3 Claims, 8 Drawing Figures

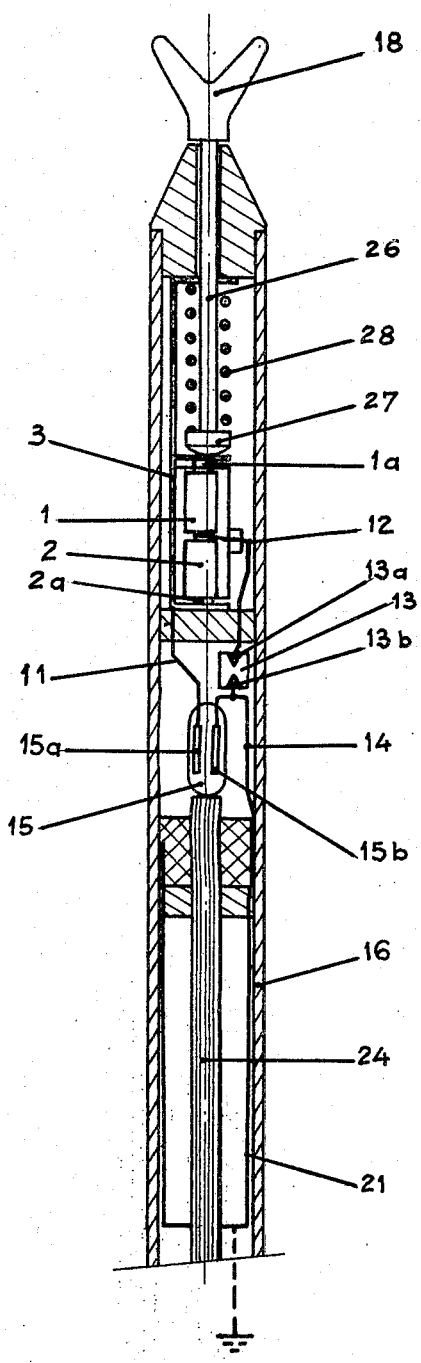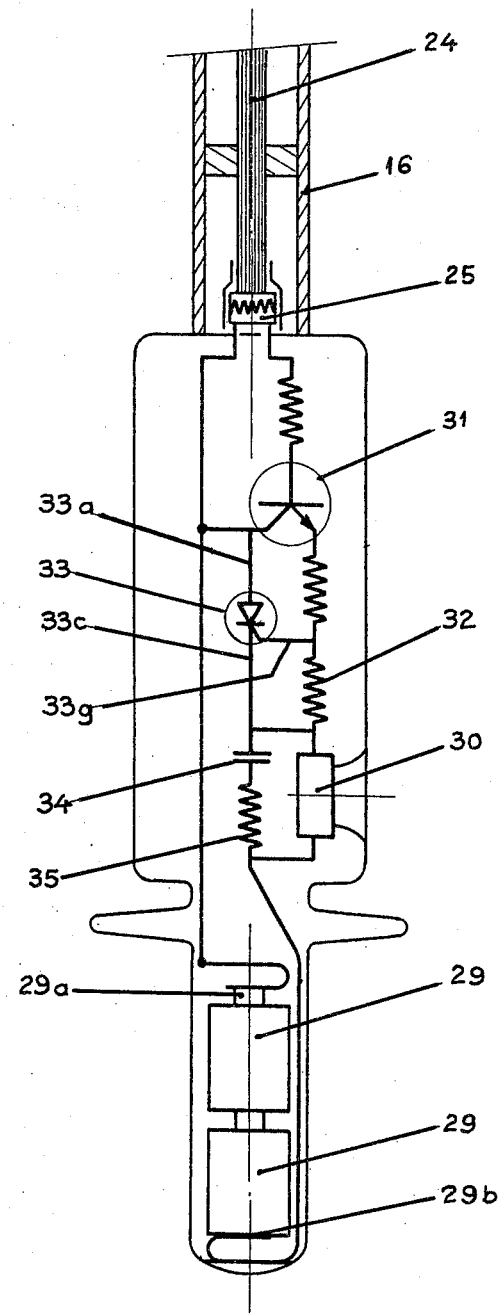
Fig. 4a
Fig. 4b

APPARATUS INCLUDING A PIEZOELECTRIC ELEMENT FOR CHECKING THE OPERATIVENESS OF A VOLTAGE TESTER

This is a continuation, of application Ser. No. 260,081 filed June 6, 1972, now abandoned.

BACKGROUND OF THE INVENTION

The present invention relates to a new and improved apparatus for checking a voltage tester as well as a voltage tester equipped with such apparatus.

Voltage testers which are employed for the purpose of checking the absence of a voltage prior to carrying out work at a high-voltage installation must be directly checked prior to use owing to the great danger which would be present should the voltage tester not function properly. This checking or testing work is presently carried out by means of a checking device incorporating a magnetic inductor or a battery-powered high-voltage generator equipped with a chopper.

SUMMARY OF THE INVENTION

It is a primary object of the present invention to provide a new and improved construction of apparatus for checking a voltage tester which is much simpler, easier to use and more economical to fabricate than the prior art equipment employing magnetic inductors or choppers.

A further object of the present invention relates to the provision of a voltage tester in which this much simpler, easier to use, and more advantageous checking apparatus can be physically incorporated, obviating the need to use a separate checking device.

Now in order to implement these and still further objects of the invention, which will become more readily apparent as the description proceeds, the inventive apparatus for checking a voltage tester is generally manifested by the features that there is provided at least one piezoelectric element connected in series with at least one spark path, and means for subjecting the piezoelectric element to a mechanical load.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 4a and 4b are schematic longitudinal sectional views through a voltage tester at which there has been mounted or installed a checking device of the type illustrated in FIG. 1, FIG. 4a illustrating the upper portion of the arrangement and FIG. 4b the lower portion of the arrangement;

DETAILED DESCRIPTION OF THE PREFERRED EMBODIMENTS

Figure 1:
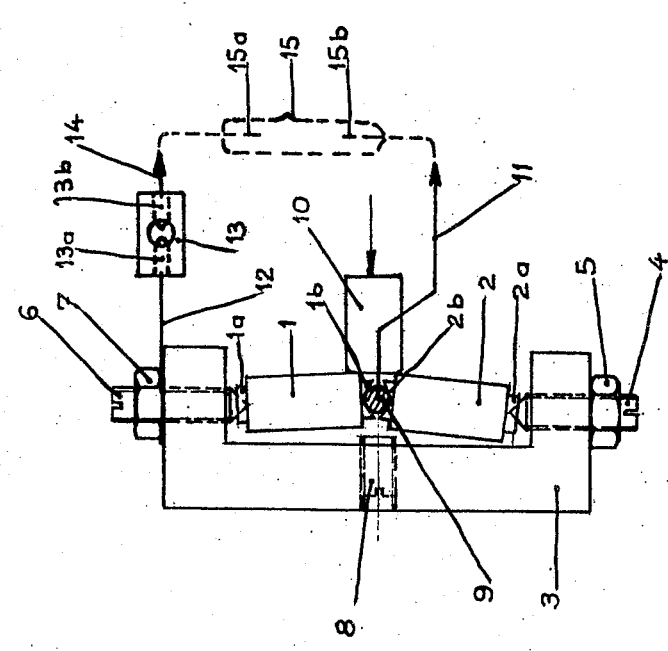
FIG. 1 is a schematic view of an embodiment of inventive checking device.

Considering now the drawings, in FIG. 1 there is illustrated the basic schematic circuit arrangement of an embodiment of inventive checking device which can be either mounted at a voltage tester or possibly designed in the form of a device independent or separate from such voltage tester.

Now the checking device depicted in FIG. 1 will be seen to comprise two piezoelectric elements 1 and 2 which are equipped at each of their respective ends with two respective electrodes 1a, 1b and 2a, 2b in such a manner that if a mechanical load is applied to the piezoelectric elements 1 and 2 a difference in potential exists between the electrodes 1a, 1b and 2a, 2b provided at the ends of such piezoelectric elements. Further, the piezoelectric elements 1 and 2 are supported in a fixed metallic frame 3 which has two support points, such as the screws 4 and 6 equipped with the counter-nut members 5 and 7 respectively. The piezoelectric elements 1 and 2 are mounted at the support points in such a manner that they can laterally rock or pivot. Now between both piezoelectric elements 1 and 2 there is arranged a metallic element 9 which forms together with the electrodes 1b and 2b a hinge or pivotal system. At this hinge point there is provided a component, such as the element 10 for instance, which renders possible the exertion of a load or pressure at the hinge arrangement in the direction indicated by the arrow.

Continuing, it is to be understood that the piezoelectric elements 1 and 2 form between themselves a large obtuse angle and are arranged in such a manner that if a pressure is exerted upon the element 10 this angle tends to further enlarge within the boundaries defined by the stop member 8. Consequently, considerable force or pressure is exerted in the direction defined by the lengthwise axes of the piezoelectric elements 1 and 2 and a difference in potential prevails, on the one hand, between their electrodes 1b, 2b and the pivot element 9 which is in electrical contact therewith and, on the other hand, the electrodes 1a, 2a which are electrically connected with one another by the frame 3 and the screws 4 and 6. This potential difference can be applied, on the one hand, to a conductor 11 coupled with the hinge element 9 and, on the other hand, to a conductor 12 coupled with the frame 3. The last-mentioned conductor 12 is electrically coupled with an electrode 13a of a spark gap or path 13, the other electrode 13b of which is connected with a conductor 14.

Hence, if with this arrangement the conductors 11 and 14 are connected with one another and a gradually increasing pressure is exerted upon the load-applying component 10, then, the potential between the conductors 11 and 12 gradually increases until reaching a value corresponding to the critical voltage of the spark gap or path 13. A spark will then jump across this spark gap 13 and the piezoelectric elements 1 and 2 partially discharge. To the extent that the pressure applied to the component 10 further increases, the potential difference will again reach the critical value of the spark gap 13 and the entire procedure will repeat a certain number of times, so that at the spark gap 13 there prevails a series of, for instance 12 to 15 successive sparks until the operation of the mechanical system is terminated by the stop member 8. If at this moment of time the pressure upon the component 10 is released, then, the mechanical system will return back into its starting position and, during this phase of unloading, the presence of a series of sparks at the spark gap 13 will once again cause a potential difference to prevail between the conductors 11 and 12 which possess the reverse polarity with regard to the polarity which was present during the pressure or load-applying phase.

If, instead of coupling the conductors 11 and 14 directly with one another, they are connected in series with a glow discharge tube 15 possessing two electrodes 15a and 15b then there will be obtained a series of glow discharges between these electrodes. The same number of discharges will be present as sparks at the spark gap and an observer, owing to the persistence of the retina of the eye, will receive the impression of continuous illumination of the glow discharge tube.

Figure 2:
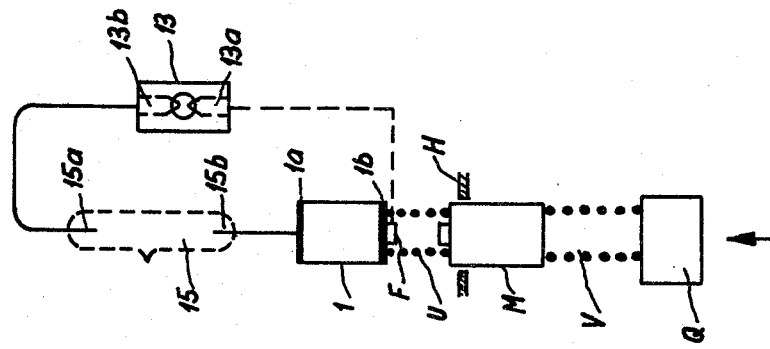
FIG. 2 is a schematic view of a second embodiment of inventive checking device.

Now the modified embodiment of checking apparatus depicted schematically in FIG. 2 comprises a piezoelectric element 1 having at its ends two electrodes 1a, 1b in such a manner that when a mechanical load is applied to the piezoelectric element 1 a potential exists between these electrodes 1a and 1b. The piezo-electric element 1 must be supported against a fixed support. In this case the support point is provided at the end of the piezo-electric element 1 which is equipped with the electrode 1a.

Following the end of the piezoelectric element 1 having the electrode 1b are a series of components constituting the end-to-end arranged return spring U, mass M, main spring V and push button Q. As can be particularly well seen by referring to FIG. 3, the mass M is equipped with a snap-type locking mechanism O. The locking mechanism O which protrudes out of the mass M is located in abutting relationship with a fixed impact or stop component H. The electrode 1a of the piezoelectric element 1 is connected with an electrode 13a of the spark gap 13. The other electrode 1b of the piezoelectric element 1 is connected with an electrode 15b of a glow discharge tube 15. The electrodes 13b and 15a of the spark gap and the glow discharge tube respectively, which are not connected with the piezoelectric element 1, are interconnected with one another. The snap-type lock mechanism O of the mass M is provided in such a way that the locking mechanism O only then is retracted back into the mass M when the main spring V between the mass M and the push button Q at which there is exerted a pressure or load, has sufficiently compressed together. At the moment where the locking mechanism is released from the associated impact member, the mass M is propelled in the direction of the piezoelectric element 1 owing to the release of the main spring V. Consequently, this mass M compresses together the relatively weak return spring U and impacts against the anvil F provided at the end of the piezoelectric element 1 equipped with the electrode 1b. As a result, the mass M suddenly or in an impact-like fashion compresses the piezoelectric element 1 and a greater potential difference prevails between the electrodes 1a and 1b. This potential difference is applied to the terminals of the series circuit consisting of the spark gap 13 and the glow discharge tube 15. Now if at this moment of time the pressure which has been exerted upon the push button Q is released, then, the mass M is returned back into its starting position by the return spring U and the locking mechanism O again is brought back to its impact position against the support H.

Figure 3:
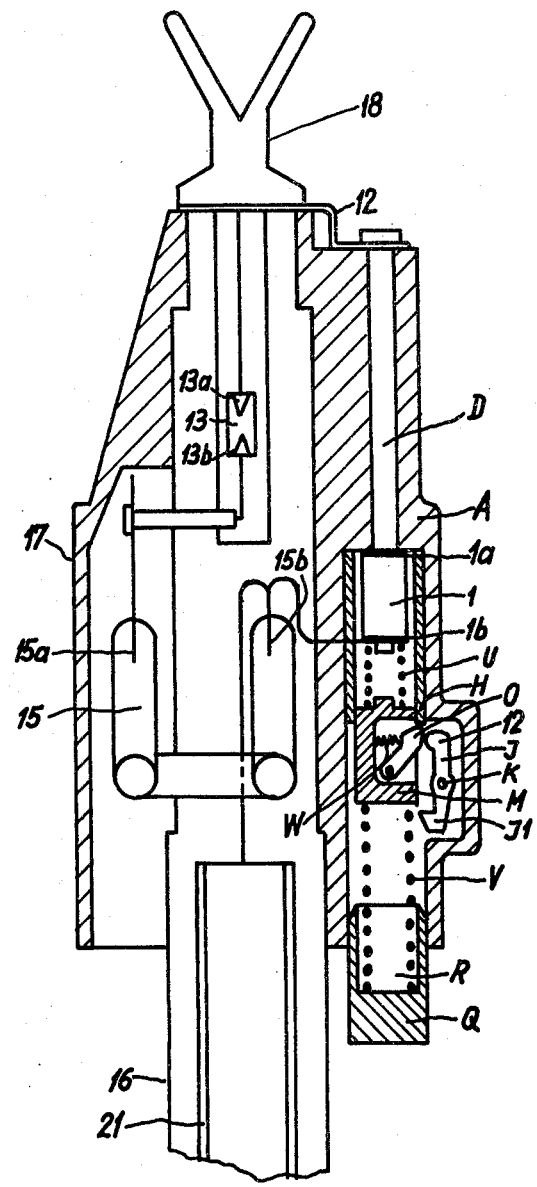
FIG. 3 is a schematic longitudinal sectional view of a voltage tester at which there has been installed or mounted the checking device of the type illustrated in FIG. 2.

FIG. 3 schematically illustrates the use of the checking apparatus of the type shown in FIG. 2 in a voltage tester with neon tubes. This voltage tester essentially consists of an insulated rod 16 carrying at its upper end a cage 17. A contact element 18 is located upon the cage 17, this contact element must be brought into contact with a conductor which has to be tested as regards its voltage condition. Contact element 18 is electrically coupled on the one hand with the electrode 13a of the spark gap 13 and on the other hand by means of a conductor piece 12 and a screw D with the electrode 1a of the piezoelectric element 1. The series of elements consisting of the piezoelectric element 1, the return spring U, the mass M, the main spring V and the push button Q, is accommodated in an elongate compartment or hollow space which is bounded by a housing A formed of any suitable insulating material and which extend parallel to the axis defined by the insulating rod 16. From an inspection of FIG. 3, it will be observed that the push button Q is partially hollow and the main spring V is supported in this hollow compartment R. Now in the elongate compartment or hollow space, indicated by reference character 100, there is provided a small region or pocket 101 at which is mounted a lever J which can rock about a pivot shaft K. The end 103 of the push button Q which is opposite the end where the pressure or loading force serving for operating such push button is exerted, is constructed so as to have a truncated conical-like configuration in order to be able to laterally displace toward one side the hammer-like shaped end J1 of the pivotal lever J. The upper end J2 of this pivotal lever J, located at the other side of the pivot shaft K, likewise possesses the shape of a hammer-head which is oriented in the same direction as the head J1 in order to be able to displace the locking mechanism O into the interior of the mass M. It will be observed that the locking mechanism O is of the pivotal type and is provided with a detent or snap-type element W in order to be able to again displace the locking mechanism O into its starting position when the pressure at the push button Q is released. The outer end H of an auxiliary cylinder, within which there is displaceably arranged the mass M and which bounds at the inner wall of the housing A, will be seen to serve as the stop for the locking mechanism O. The electrodes 15a and 15b of the neon tube 15 accommodated in the cage 17 are respectively electrically coupled with the electrode 13b of the spark gap 13 and the electrode 1b of the piezoelectric element 1. Reference numeral 21 designates a metallic armature which is electrically coupled with the electrode 15b of the neon tube 15 and is housed internally of the insulation rod 16. The armature 21 serves to cooperate in a capacitive manner with ground when the contact element 18 has been placed into contact with a conductor to which there has been applied an alternating-current voltage.

Now in FIGS. 4a and 4b there is illustrated the use of a checking device similar to that disclosed in conjunction with the description of FIG. 1 in a different voltage tester which also has a glow discharge tube, wherein, however, the light emitted by this tube is conducted through the agency of a light conductor 24 to a photo-sensitive element 25. As previously indicated, as a matter of convenience in illustration, the upper portion of the apparatus has been depicted in FIG. 4a and the lower portion thereof in FIG. 4b. Now, as will be explained more fully hereinafter, the photo element 25 is connected with a signal amplifier and control circuit which is accommodated at the lower portion of the insulated rod 16. The upper portion of this insulated rod 16 carries a contact element or piece 18 which is applied to one end of a metallic rod 26 which terminates at its base end at a hammer or impact element 27 and which is loaded by a spring 28 intended to press the hammer 27 against two piezoelectric elements 1 and 2. These piezoelectric elements 1 and 2 are supported at a frame 3 of conductive material and are arranged in opposed relationship such that when they are subjected to the impact of the hammer 27, a potential difference prevails on the one hand between their outer electrodes 1a, 2a which are at the same potential and, on the other hand, their common terminal at which there is connected a conductor 12. By means of the frame or bracket 3 and a conductor 11, the electrodes 1a, 2a are directly coupled with an electrode 15a of the glow discharge tube 15. The conductor 12 is connected with an electrode 13a of a spark gap or path 13, the other electrode 13b of which is connected with the second electrode 15b of the glow discharge tube 15 by means of a conductor 14. The last-mentioned conductor 14 is itself connected with a metallic armature 21 which is destined to capacitively cooperate with ground when the contact element 18 is placed into contact with a conductor to which there has been applied alternating current voltage.

Now in the event that the operator desires to check whether the voltage tester is properly functioning, then he exerts a pull upon the contact element 18, resulting in compression of the spring 28, and then again releases such contact element so that owing to the force of the compressed spring 28 the hammer or striker piece 27 will impact against the superimposed arranged piezoelectric elements 1 and 2. The voltage prevailing between the electrodes of the piezoelectric elements 1 and 2 arrives between the electrodes 15a and 15b of the tube 15 via the spark gap 13 and produces a brief illuminating discharge at the glow discharge tube 15. The thus produced light is transmitted through the agency of the light conductor 24 to the photo-sensitive element 25 which, in turn, is electrically coupled to the terminals of an electronic switching circuit which will be more fully discussed hereinafter. At this point it is mentioned that such circuit serves to permit the flow of current from a power source 29 to an indicator element 30, for instance a buzzer, as soon as the light beam arriving at the photo-sensitive element 25 has attained a certain intensity corresponding to a voltage applied to the contact element 18 which at least is equal to a predetermined value constituting the stimulation threshold of the voltage tester. Under these conditions the current flowing across the photo-sensitive element 25 is amplified, by means of a transistor 31. The current flowing across the collector-emitter path of this transistor 31 produces a potential difference at the terminals of a resistor 32. This potential difference is applied between the cathode 33c and the control electrode 33g of a thyristor 33, so that this thyristor begins to conduct and permits the flow of current. This current flows from the positive electrode 29a of the voltage source 29 through the anode 33a and the cathode 33c of the thyristor 33 and back to the negative electrode 29b of the source 29 and through the buzzer 30. The buzzer 30 constituting the indicating device can be of conventional electromagnetic type design consisting of a magnetic circuit and a vibrating lamellae which periodically interrupts current flow. Consequently, when such buzzer 30 is connected with a thyristor, it stops functioning after the initial opening of the vibrating contact which follows the point in time when there has been removed the control voltage at the control electrode of the thyristor. Consequently, owing to the very short duration of the glow discharge at the tube 15 and the excitation of the photo-sensitive element 25, the current, which flows through a simple buzzer 30 connected in series with the thyristor 33, itself would be of too brief duration so that the signal could be clearly perceived by the operator. In order to overcome this drawback, and as contemplated by the invention, a circuit is connected between the terminals of the buzzer 30 and which consists of a capacitor 34 and a resistor 35 connected in series, and the time-constant of which is designed such that the flow of current through the buzzer 30 remains for a sufficient amount of time in order to be positively perceived or detected by the operator.

Figure 5:
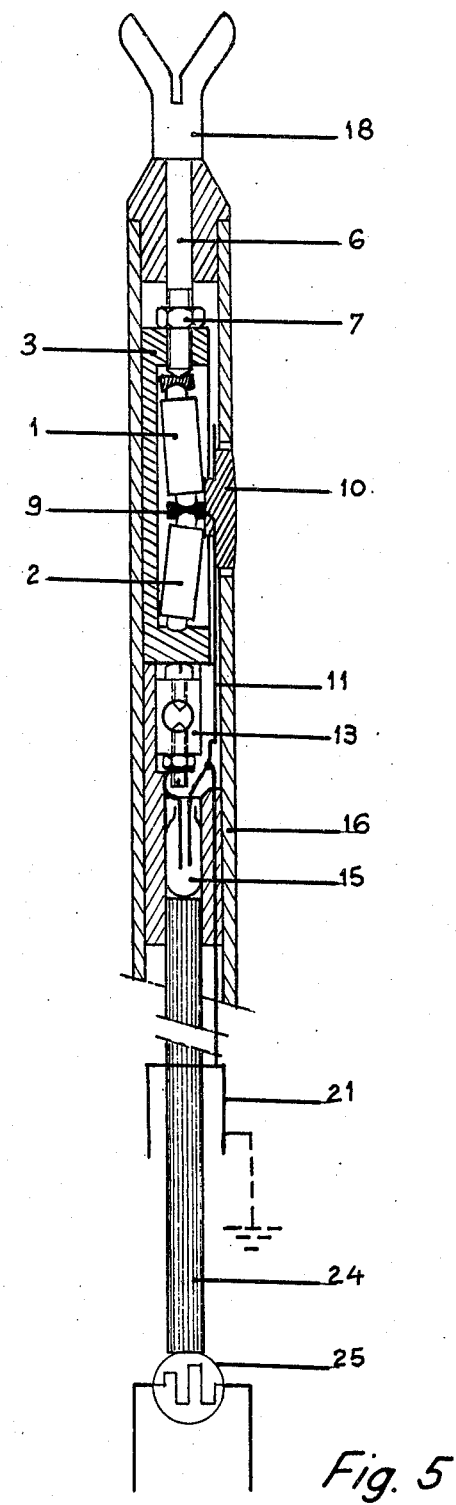
FIG. 5 is a longitudinal sectional view, similar to the showing of FIGS. 4a and 4b, of a variation of the use of the checking device of the type shown in FIG. 1 at a voltage tester similar to that depicted in FIGS. 4a and 4b.

Now in FIG. 5, there is shown the use of a similar checking device in a voltage tester like that shown in FIGS. 4a and 4b, however in a system where the piezoelectric elements 1 and 2 are subjected to a mechanical load by means of an apparatus similar to that shown in FIG. 1, and by which the actuation or load-applying element 10 possesses the form of a push button arranged externally of the insulating rod 16.

Figure 6:
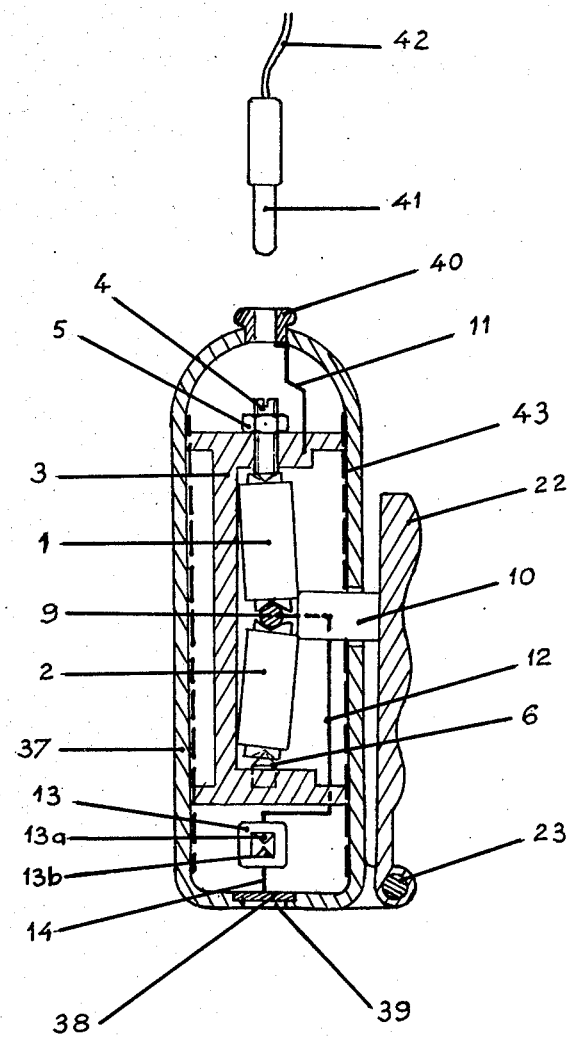
FIG. 6 is a longitudinal sectional view through a piece of equipment incorporating the checking device of the type shown in FIG. 1 and which is separate or independent from the voltage tester.

FIG. 6 illustrates an embodiment of the invention in the form of a checking apparatus which is independent or separate from the voltage tester. In this conventional embodiment, the essential components which have been previously described in conjunction with the arrangement of FIG. 1, and which for convenience in description have been generally designated with the same reference characters, are enclosed in a housing 37 formed of any suitable insulating material. Housing 37 is equipped at its outside with a grip 22 assembled together with the actuation element 10 and pivotably mounted upon a shaft or pivot axle 23. A conductor 12 is connected on the one hand with the conductor element 9; arranged between the piezoelectric elements 1 and 2, and, on the other hand, is connected with an electrode 13a of a spark gap or path 13. The other electrode 13b of the spark gap 13 is connected through the agency of a conductor 14 with the contact element 38 located at the lower region of the device in a hole or aperture 39. The device is provided at its upper portion with a conductive bushing or sleeve 40 which is connected through the agency of a wire 11 with the frame 3 and which serves the purpose of receiving a contact pin 41 connected at the end of an external connection cable 42. The frame 3 on the other hand is in contact with a conductive armature 43 which, for instance, consists of a layer of conductive lacquer coated over the major portion of the inner surface of the housing 37.

Figure 7:
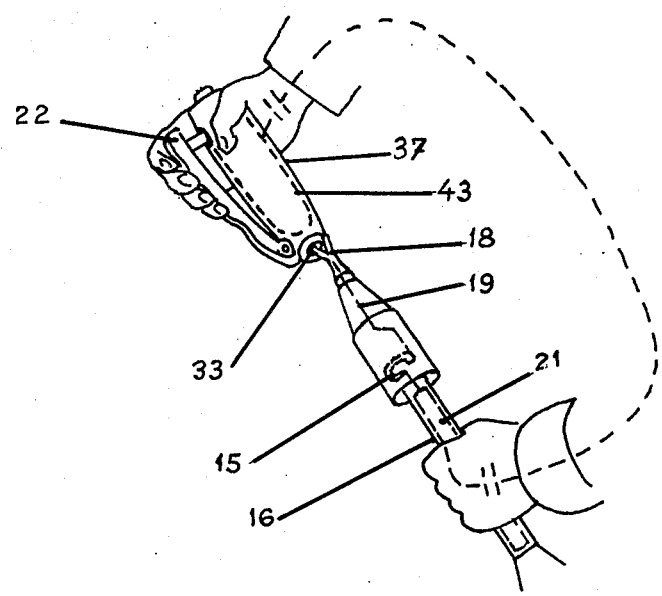
FIG. 7 is a schematic perspective view of the equipment shown in FIG. 6 depicted at the moment where it is being used for checking a voltage tester.

Now, FIG. 7 depicts the apparatus described in conjunction with FIG. 6 above during its use for checking a standard single-pole voltage tester essentially embodying the contact element 18, the glow discharge tube 15, and a conductive armature 21 enclosed in the insulating rod 16. Now in order to be able to check the voltage tester, the user grasps with one hand the apparatus at its housing and with the other hand grasps the insulated rod 16 of the voltage tester. Thus there prevails a considerable capacitance between the first hand and the conductive armature 43 of the testing apparatus and on the other hand a further capacitance exists between the second hand of the user and the conductive armature 21 of the voltage tester. The electrical circuit thus is closed through or across the body of the user and passes through the checking system via the contact element 18, the internal conductor 19, the glow discharge tube 15, and the armature 21 connected with the glow discharge tube. The operator then carries out a series of squeezing movements upon the handgrip 22 of the testing apparatus, each movement causing a compression or relaxation of the piezoelectric element and, according to the already described procedures, there exists a series of discharges at the spark gap 13. Each discharge corresponds to a brief current flow through the entire system and especially through the glow discharge tube which, owing to the persistence of the retina of the eye, as well as the very short time intervals between successive discharges, imparts the impression to the operator of a continuous illumination of the glow discharge tube, so that the faultness functional preparatory state of the voltage tester can be indicated. The current flowing through the circuit does not exceed a few microamperes, that is to say, the current flow through the hands and body of the operator is not felt at all.

The apparatus described in conjunction with and illustrated in FIG. 6 can also be used for checking bipolar voltage testers, that is voltage testers with two contact electrodes. In such case, the conductor element 39 of the apparatus is brought into contact with one of these electrodes whereas the second electrode is connected with the connection cable 42, the pin 41 of which during this operation is inserted into the bushing or sleeve 40 in order to close the circuit.

While there is shown and described present preferred embodiments of the invention, it is to be distinctly understood that the invention is not limited thereto but may be otherwise variously embodied and practiced within the scope of the following claims.

Accordingly, what is claimed is:

1. In a voltage tester of the type comprising one or more contact elements for engaging a conductor to be tested for its voltage condition, an insulated armature for capacitively cooperating with ground, and an indicating circuit including glow discharge means connected between said contact elements and said armature, the improvement which comprises the provision of means for checking the operativeness of said voltage tester comprising a piezoelectric device, a member for applying a mechanical load thereto to produce a voltage between opposed terminals of the piezoelectric device, electrical leads extending from said terminals, and a spark-gap in one of said leads, said leads being arranged for connection across said indicating circuit of the voltage tester, said piezoelectric device comprising a metallic frame having two terminal support points, two piezoelectric elements having respective ends mounted for pivotal movement about said terminal support points, a metallic terminal member located between their other ends so that the piezoelectric elements form a large obtuse angle, said member for applying the mechanical load being mounted adjacent said metallic terminal member to change said angle.

2. In a voltage tester of the type comprising one or more contact elements for engaging a conductor to be tested for its voltage condition, an insulated armature for capacitively cooperating with ground, and an indicating circuit including glow discharge means connected between said contact elements and said armature, the improvement which comprises the provision of means for checking the operativeness of said voltage tester comprising a piezoelectric device, a member for applying a mechanical load thereto to produce a voltage between opposed terminals of the piezoelectric device, electrical leads extending from said terminals, and a spark-gap in one of said leads, said leads being arranged for connection across said indicating circuit of the voltage tester, said piezoelectric device comprising a single piezoelectric element having terminals at each end, a spring supported mass, a snap-lock mechanism for restraining said mass, and push-button means for releasing said mass to cause it to contact the piezoelectric element to apply a load thereto.

3. In a voltage tester of the type comprising one or more contact elements for engaging a conductor to be tested for its voltage condition, an insulated armature for capacitively cooperating with ground, and an indicating circuit including glow discharge means connected between said contact elements and said armature, the improvement which comprises the provision of means for checking the operativeness of said voltage tester comprising a piezoelectric device, a member for applying a mechanical load thereto to produce a voltage between opposed terminals of the piezoelectric device, electrical leads extending from said terminals, and a spark-gap in one of said leads, said leads being arranged for connection across said indicating circuit of the voltage tester, said piezoelectric device, said member for applying a mechanical load, and said sparkgap being located in a housing having an internal conductive armature connected to one of said electric leads, said housing being adapted to be held in one hand of an operator so that when the other hand grasps the voltage tester and engages a contact element thereof with the other of said electrical leads, a capacitive connection is made across said indicating circuit through the operator's body.

* * * * *